US007946012B2

(12) United States Patent
Cox et al.

(10) Patent No.: US 7,946,012 B2
(45) Date of Patent: May 24, 2011

(54) APPARATUS FOR INSTALLING A WASTER DISPOSER SINK MOUNT

(76) Inventors: Daniel W. Cox, Vernon Hills, IL (US); Kevin M. Schnurstein, McHenry, IL (US)

( * ) Notice: Subject to any disclaimer, the term of this patent is extended or adjusted under 35 U.S.C. 154(b) by 1146 days.

(21) Appl. No.: 11/698,707

(22) Filed: Jan. 26, 2007

(65) Prior Publication Data

US 2008/0178455 A1 Jul. 31, 2008

(51) Int. Cl.
*B23P 19/04* (2006.01)

(52) U.S. Cl. ................ 29/255; 29/259; 29/264; 29/278; 29/271

(58) Field of Classification Search .................... 29/255, 29/244–254, 256–278
See application file for complete search history.

(56) References Cited

U.S. PATENT DOCUMENTS 1,481,061 A 1/1924 Hunter
3,154,256 A 10/1964 Bebinger
3,270,407 A 9/1966 Araujo
1,119,125 A 5/1967 Nessamar et al.
4,175,735 A 11/1979 Griffin
4,411,054 A 10/1983 Zeilenga
4,492,014 A * 1/1985 Alexander ...................... 29/259
5,058,256 A * 10/1991 Taylor et al. .................... 29/260
5,177,853 A 1/1993 Herook
5,297,779 A 3/1994 Collins, Jr. et al.
5,557,833 A * 9/1996 Pool ................................ 29/261
5,584,110 A 12/1996 Mordoch
6,012,211 A * 1/2000 Ochoa et al. ................. 29/426.5
7,024,743 B2 4/2006 Heaton
7,322,087 B1 * 1/2008 Hu et al. ......................... 29/261
7,770,277 B2 * 8/2010 Wridt .............................. 29/261
2003/0025015 A1 2/2003 Batten
2003/0033670 A1 2/2003 Cantrell
2003/0131463 A1 7/2003 Sigman
2006/0065881 A1 3/2006 Walton et al.
2008/0178455 A1 * 7/2008 Cox et al. ........................ 29/464

* cited by examiner

*Primary Examiner* — Lee D Wilson
(74) *Attorney, Agent, or Firm* — Meroni & Meroni, P.C.; Charles F. Meroni, Jr.; Christopher J. Scott

(57) ABSTRACT

An apparatus and method enhances installation of a waste disposer mounting assembly at a drain-received sink flange. The apparatus comprises a carriage guide, a carriage assembly, and a spring-actuable notch stop. The carriage guide comprises a hooked end, a handled end, and a notched face extending intermediate the hooked and handled ends. The carriage assembly is translatably and cooperably associated with the carriage guide and comprises a centralized rail guide aperture and a plurality of fastener-engaging arm assemblies. The guide aperture is sized and shaped to receive the guide rail and the notch stop engages the notched face for selectively prevent translation of the carriage assembly relative to the carriage guide. The arm assemblies of the carriage assembly carry a mounting assembly via fastener-port engagement to a mount position where a snap ring fastener may be manually installed to prevent downward displacement of the mounting assembly from the mount position.

11 Claims, 11 Drawing Sheets

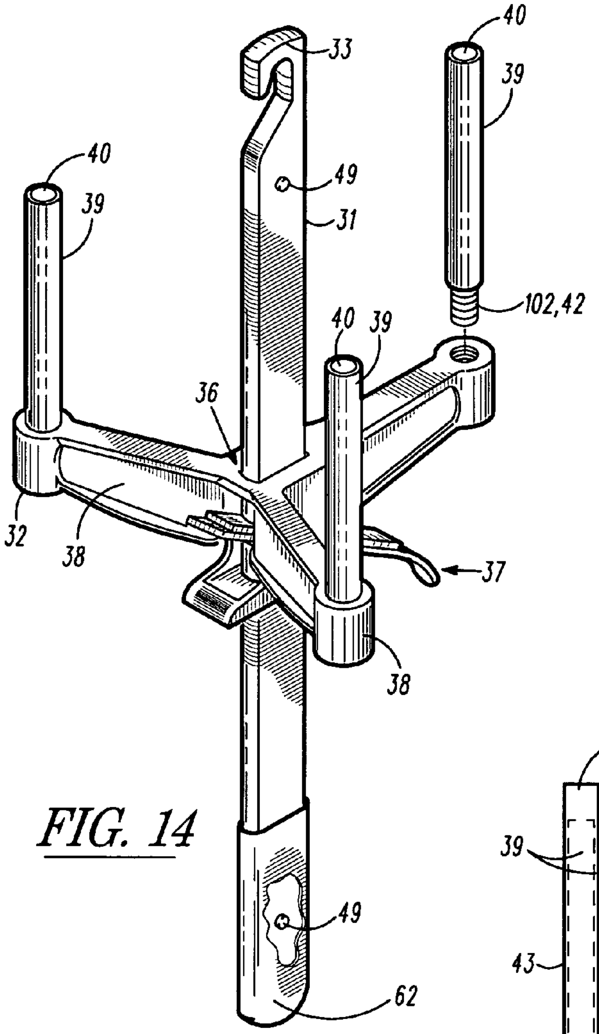
FIG. 14
FIG. 14(a)
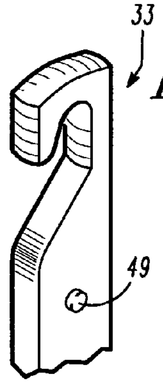
FIG. 14(b)
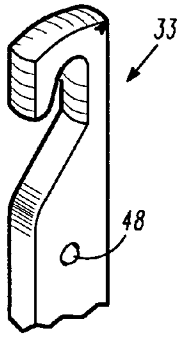
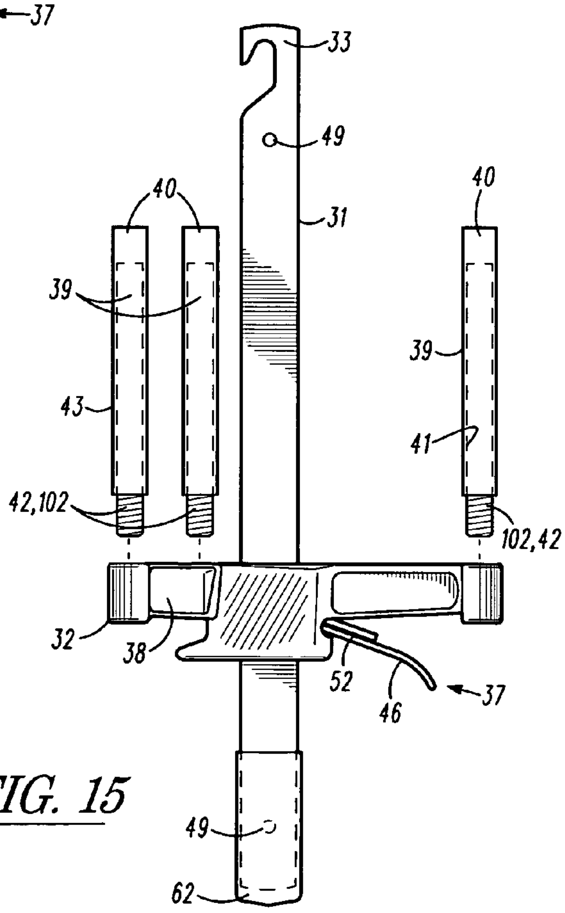
FIG. 15

APPARATUS FOR INSTALLING A WASTER DISPOSER SINK MOUNT

BACKGROUND OF THE INVENTION

1. Field of the Invention

The present invention generally relates to a hand tool for installing a waste disposer sink mount. More particularly, the present invention relates to a clamp or installation apparatus for carrying a waste disposer upper sink mount assembly to a mount position and for locking the upper sink mount assembly in the mount position for enabling manual installation of a mount-retaining snap ring upon a drain-received sink flange.

2. Description of the Prior Art

The prior art sparsely descriptive with regard to tools specifically designed for aiding in the installation of a waste disposer sink mounting assembly upon a drain-received sink flange. Certain prior art generally related to the function of the present invention as well as certain prior art related to sink flange installation methodology and the like are briefly described hereinafter.

U.S. Pat. No. 1,481,061 ('061 patent), which issued to Hunter, discloses a Machine for Removing Tires from Rims. In this regard, the '061 patent teaches a machine comprising a table structure including a top and legs depending therefrom, said legs being provided at their lower ends with notches, a spider arranged within the lower portion of the table structure and including arms having their outer ends received within said notches, said arms being provided at their outer ends with upwardly projecting heads adapted to engage the outer walls of said legs, an upstanding shaft secured to the spider and extending above the table structure, a removing spider slidable upon the shaft and having arms to engage the rim to force the same from the tire while the tire is supported upon said table top, and an operating element screw threaded upon the upper portion of the shaft and engaging the removing spider.

U.S. Pat. No. 3,270,407 ('407 patent), which issued to Araujo, discloses a Screw Threaded Freeze Plug Pull-out Tool with Work Engaging Means. The '407 patent teaches a plug pull-out tool for removing a plug from an engine block, with said plug having a hole drilled therein for receiving an end of said tool, said tool comprising means to engage side walls of said hole, a V-shaped support to straddle the plug to be removed, said V-shaped support having a threaded opening extending through the apex thereof, and bisecting the V, a screw in threaded engagement with said opening, a handle secured to the end of the screw extending outward from the apex of the V-shaped support, a reduced cylindrical portion extending axially from the end of said screw within the V-shape support, said means to engage the side walls of said hole, comprising a flat U-shaped member positionable on said reduced cylindrical portion in an inclined manner, a button head of substantially the same diameter as said screw secured to the outer end of said reduced cylindrical portion, adapted to retain said U-shaped member on said reduced portion, whereby the reduced cylindrical portion with the U-shaped member in an inclined position can be inserted in the hole of said plug, upon rotation of said screw said U-shaped member assumes a position at right angle to said cylindrical portion, and upon continuing rotating said screw will force the U-shaped member to bear against the walls of the hole and thereby remove the plug from the engine block.

U.S. Pat. No. 4,411,054 ('054 patent), which issued to Zeilenga discloses certain methodology for Installing a Sink Drain Flange Assembly, which assembly is capable of supporting a garbage disposal. The '054 patent teaches a removable clamping device for firmly holding a drain flange within the drain hole of a sink, so that one can assemble around the depending body of the flange which body is disposed below the sink one or more rings and a split spring type ring or Cee-shaped keeper so that the rings are maintained around the body of the flange and in turn a garbage disposal may be mounted to the rings.

U.S. Pat. No. 5,177,853 ('853 patent), which issued to Herook, discloses a Garbage Disposal Flange Assembly Tool. The '853 patent teaches a tool for the installation of a sink flange and garbage disposal mounting flange assembly in the drain opening of a sink, such tool including a generally U-shaped member with the tops of each side thereof extending outward, a shaft member affixed to a central portion of the U-shaped member extending between the sides thereof, such shaft receiving the mounting flange assembly and having a threaded portion passed through the drain opening in the sink in which is positioned the sink flange and on which shaft is positioned a retention member, such shaft passing through an aperture centrally defined in such retention member with a handle member having a threaded engagement aperture to be screwed down on the shaft to retain the sink flange and garbage disposal mounting flange structure in place during installation thereof.

U.S. Pat. No. 5,297,779 ('279 patent), which issued to Collins, Jr. et al., discloses a Jack Mechanism having Safety Protection for Workers. The '279 patent describes a high/low screw jack stand mechanism is presented having inner and outer telescoping tubes for coarse elevational adjustment and having an adjustment screw and nut assembly for fine elevational adjustment. For coarse adjustment a thrust washer, surrounding the inner work elevation tube, permits free upward movement of the elevating tube relative to the outer support tube and is automatically positioned in angular binding relation with the elevating tube by a thrust washer positioner which has supporting engagement with one side of the thrust washer to restrain downward movement of the elevating tube. A thrust washer restraint member extends upwardly from and in spaced relation with the thrust washer positioner to restrain the thrust washer from moving upwardly along with the elevation tube. To ensure against possible injury to workers when the thrust washer is manually moved to its release position, an inner stop is provided within the support tube to limit downward movement of the elevating tube to a position at which the adjustment nut and elevation tube support flange is sufficiently spaced from the thrust washer and its restraint that injury cannot occur.

U.S. Pat. No. 7,024,743 ('743 patent), which issued to Heaton, discloses a Garbage Macerator Installation Mount. The '743 patent teaches a support assembly useful in aligning and mounting a garbage disposal to the drain fitting of a sink includes a base provided with a vertical tube segment supporting a nut assembly threadably engaged to a rod partly received in the segment with the upper rod end supporting an adapter conformed to the disposal. An offset bar fixed to the rod exterior engages a lateral recess on the segment to fix the rod in rotation as the nut assembly is turned. The assembly may include rods of differing lengths and adapters of various forms.

United States Patent Application Publication No. 2006/0065881, authored by Walton et al., teaches a device that can be used for installing or removing a garbage disposal unit while allowing the user to keep his hands free. GDL is comprised of a jack, jack handle, base, and platform. A user utilizes this device by securing a garbage disposal unit on the platform and jacking the garbage disposal unit into or out of position under the mounting assembly. The user can then use two free hands to maneuver the garbage disposal unit.

From an inspection of the foregoing disclosures as well as from a consideration of the art in general, it will be seen that the prior art does not teach or otherwise disclose a clamp assembly comprising a cooperative carriage and a carriage guide for clamping a waste disposal mounting assembly adjacent a drain-received sink flange. The prior art thus perceives a need for such an apparatus that provides distinct advantages over prior or current hand tools designed to aid installation technicians when installing waste disposal units as set forth in more detail hereinafter.

SUMMARY OF THE INVENTION

Accordingly, the prior art perceives a need for an installation tool or apparatus designed to aid installation of waste disposal units. More particularly, the apparatus of the present invention is designed for installing a waste disposal sink mounting assembly, the installation tool for enhancing installation the waste disposal sink mounting assembly upon a drain-received sink flange. The clamp or installation tool of the present invention essentially comprises a carriage guide, a carriage assembly, and means for selectively preventing translation of the carriage assembly relative to the carriage guide. The carriage guide comprises a hooked end, a handled end, and a notched face extending intermediate the hooked and handled ends. The carriage assembly is translatably and cooperably associated with the carriage guide and comprises a centralized rail guide aperture and a plurality of fastener-engaging arm assemblies. The means for selectively preventing translation of the carriage assembly relative to the carriage guide may be preferably defined by a spring-actuable notch stop assembly integrally associated with the carriage assembly.

The guide aperture is sized and shaped to receive the guide rail. The spring-actuable notch stop is engageable with the notched face of the guide rail for enabling a user to selectively prevent carriage translation relative to the guide rail. The arm assemblies of the carriage assembly each comprise a fastener-receiving port. The upper mounting assembly (for mounting a waste disposal unit) is receivable about the guide rail and the fasteners thereof are receivable in the fastener-receiving ports. The hooked end of the guide rail is hookable upon the hook ring of a ring-cap assembly (receivable in the sink flange) and the carriage assembly is translatable toward the sink flange along the guide rail.

The upper mounting assembly is thereby positionable intermediate a sink-engaging flange and the ring-receiving recess of a sink flange. The spring-actuable notch stop assembly function (1) to lock the carriage assembly upon the guide rail with the upper mounting assembly fixedly positioned intermediate the sink-engaging flange and the ring-receiving recess and (2) to temporarily fix or anchor the sink flange. The clamp or installation apparatus or tool of the present invention thus functions to enhance an installer's ability to manually install a mount-retaining snap ring fastener element upon the sink flange. The snap ring fastener element, thus installed, essentially functions to prevent downward displacement of the mounting assembly relative to the sink flange, and the mounting assembly, thus positioned, enables proper waste disposal unit mounting.

Other objects of the present invention, as well as particular features, elements, and advantages thereof, will be elucidated or become apparent from, the following description and the accompanying drawing figures.

BRIEF DESCRIPTION OF THE DRAWINGS

Other features of our invention will become more evident from a consideration of the following brief description of patent drawings:

FIG. 13(*a*) is an enlarged sectional view taken from FIG. 13 depicting in detail the engagement intermediate the spring-actuable notch stop assembly and the notched face.

FIG. 13(*b*) is an enlarged sectional view taken from FIG. 12 depicting in detail the engagement intermediate the spring-actuable notch stop assembly and the notched face.

FIG. 14 is a top perspective view of the installation apparatus of the present invention showing a hooked guide rail and a carriage assembly received upon the guide rail intermediate carriage upper and lower stop structures with a support shaft shown exploded from the carriage assembly and certain portions of a handle sheath being broken away to depict the lower stop structure.

FIG. 14(*a*) is a fragmentary top perspective view of the hooked end of the guide rail depicting a first alternative upper stop structure.

FIG. 14(*b*) is a fragmentary top perspective view of the hooked end of the guide rail depicting a second alternative upper stop structure.

FIG. 15 is a side view depiction of the of the installation apparatus of the present invention showing a hooked guide rail and a carriage assembly received upon the guide rail intermediate carriage upper and lower stop structures with three support shafts shown exploded from the carriage assembly and certain portions of the support shaft sheathing and handle sheathing being broken away to depict otherwise hidden structure.

DETAILED DESCRIPTION OF THE PREFERRED EMBODIMENT(S)

Figure 1:
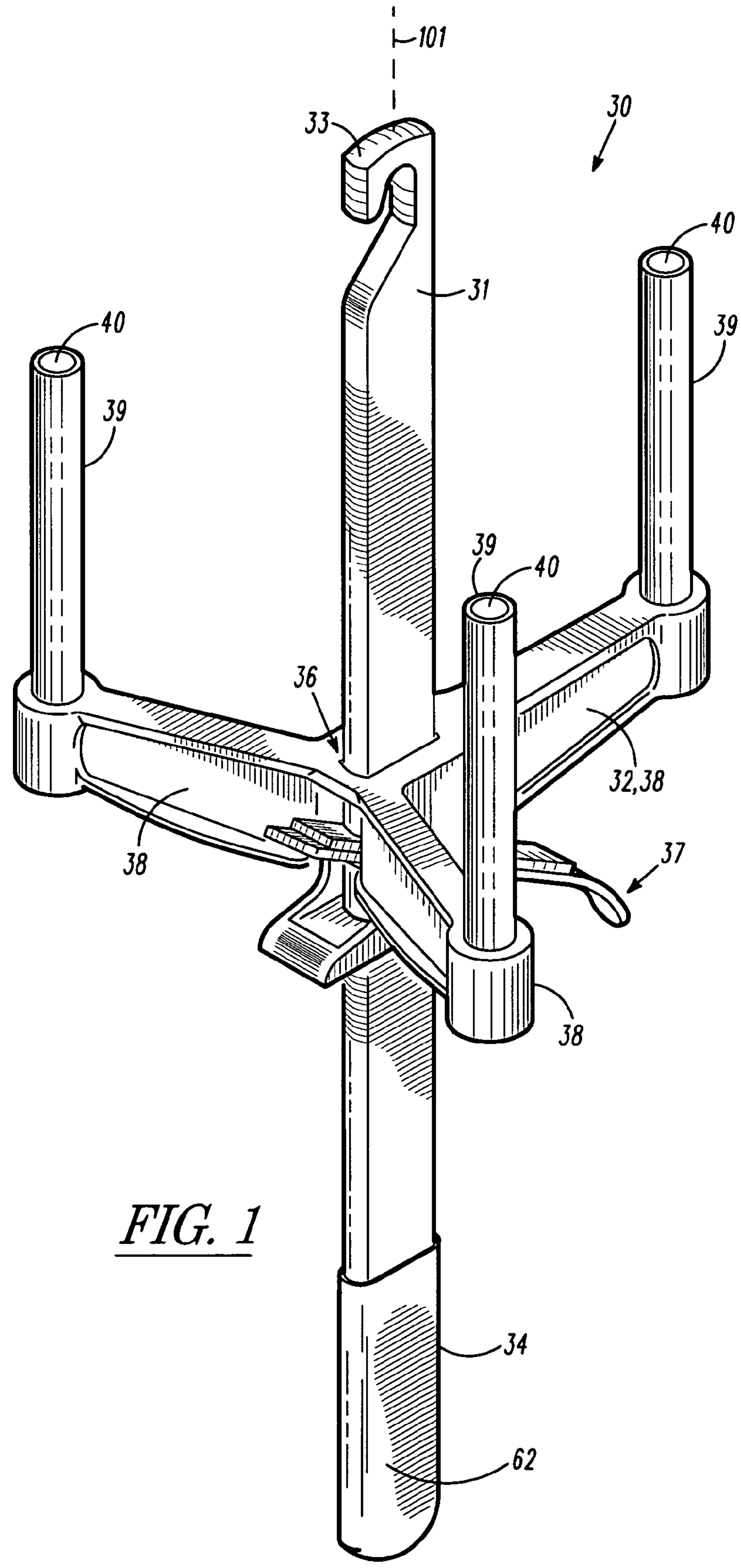
FIG. 1 is a top perspective view of the installation apparatus of the present invention showing a hooked guide rail and a carriage assembly translatably received upon the guide rail.

Referring now to the drawings with more specificity, the preferred embodiment of the present invention generally concerns a clamp or installation tool 30 as generally illustrated and referenced in FIGS. 1-3, 6, 11, 12, 13, 14, and 15. It is contemplated that the clamp or installation tool 30 of the present invention may well function to aid an installation technician (with a first set of hands) when performing waste disposal unit installation. In this regard, it is noted that sink flanges or flanged drain collars are typically loosely received in the drain apertures of sink basins. A sink flange or flanged drain collar 11 as contemplated by the present invention is illustrated and referenced in FIGS. 2, 3, 5-8, and 10; a sink or sink basin 10 is illustrated and referenced in FIGS. 2-7, 9, and 10; and a drain aperture 15 formed in the sink basin 10 is generally depicted and referenced in FIGS. 2-5, 7, 9, and 10 for the reader's quick inspection.

When installation of a waste disposal unit is desired, it is preferred that the sink flange or flanged drain collar 11 be fixed. It is desirable to preliminarily fix a sink flange 11 so that final waste disposal unit mounting may be made easier or more efficient. Given the state of the art, it is oftentimes necessary to either add weighty matter in superior adjacency to the sink flange 11 from within the sink basin 10 or solicit the help from a second installation technician (with a second set of hands) to manually retain the sink flange 11 from below the sink flange 11. In other words, the sink flange 11 must be anchored via some downward force so that incident forces thereupon do not otherwise cause movement of the sink flange such as when an installer wishes to install a snap ring fastener 13 upon the sink flange 11 or to otherwise enable manual actuation of certain mount-retaining means.

Given limited space concerns typically associated with sink-supporting cabinetry, it should be clear that having a second installer present is not only inefficient but awkward. Further, the weighty masses that may be safely placed atop the sink flange 11 to anchor the same are typically poor anchors and incident forces upon the sink flange 11 are often sufficient to cause movement of the sink flange 11 despite the anchor attempt via the weighty mass. The clamp or installation tool 30 of the present invention thus functions, in part, to aid the installer by temporarily fixing or anchoring a flanged drain collar or sink flange 11 as received in the drain aperture 15. The temporarily fixed drain collar 11 enhances manual (i.e. with one's hands) installation of a mount-retaining snap ring fastener 13, which snap ring fastener 13 often requires two-handed manipulation for most efficient and effective installation. A snap ring fastener 13 is illustrated and referenced in FIGS. 2, 3, 5, and 6.

It should perhaps be noted that a waste disposal upper mounting assembly 14 is retainable about the sink flange 11 following installation of the snap ring fastener 13 for prepositioning the upper mounting assembly 14. In this regard the reader is directed to FIGS. 2, 3, and 6. From a comparative inspection of the noted figures, it may be seen that the prepositioned upper mounting assembly 14 further enables waste disposal unit mounting by providing a structural mount to which the waste disposal unit may be anchored. During the installation of the upper mounting assembly 14, the sink flange 11 is temporarily anchored. The cooperative interplay of a number of elements would thus tend to teach a certain installation system. In this regard, it is contemplated that the clamp or installation tool 30 of the present invention, when viewed in combination with other conventional or typical plumbing-type components found at or near a waste disposal installation site, may thus be thought of as waste disposal sink mount installation system.

Figure 2:
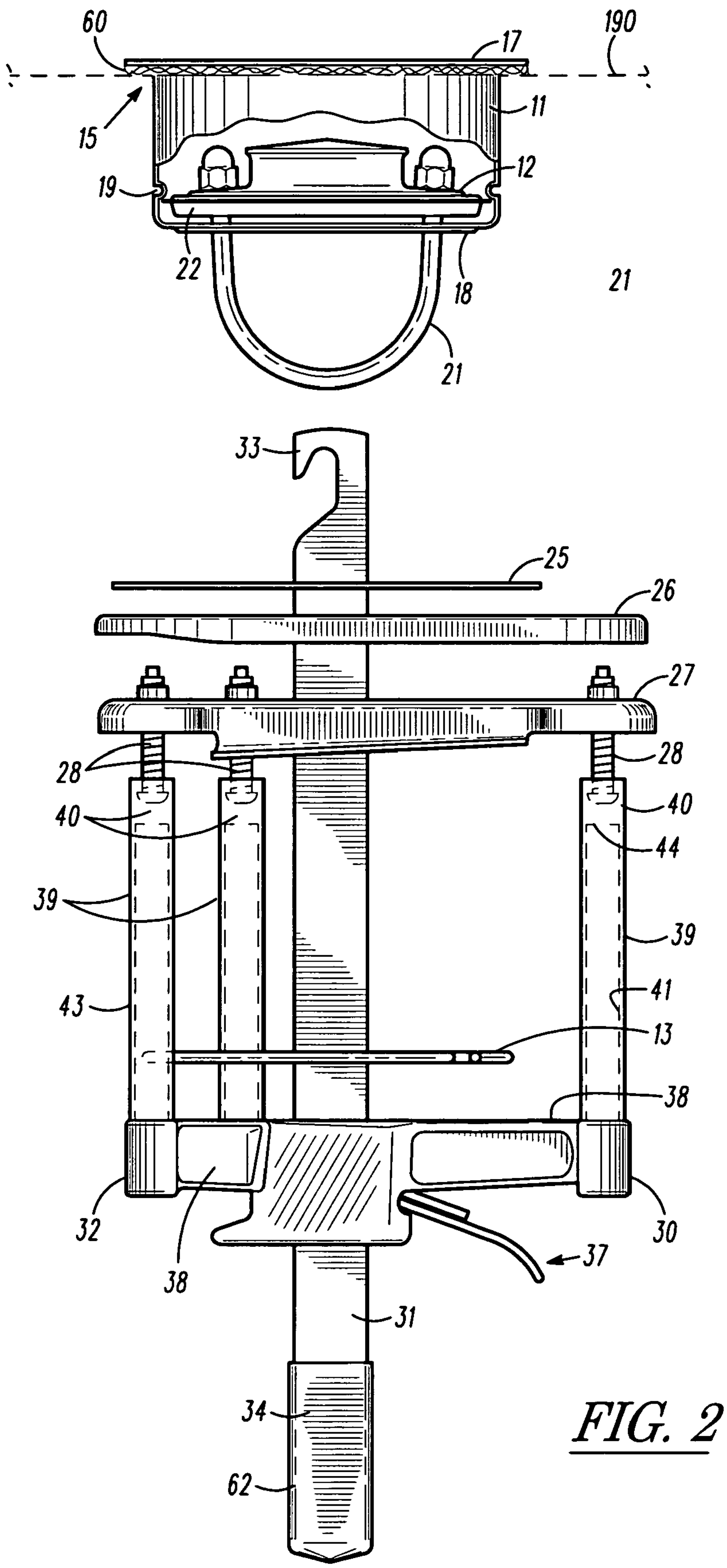
FIG. 2 is a side view depiction of the installation apparatus of the present invention with certain parts shown in broken lines to depict otherwise hidden structure, which apparatus is juxtaposed in inferior adjacency to a ring-cap assembly as received in a flanged drain collar as received in a fragmentary system-supporting sink basin. The sink basin is shown in broken lines and the collar is shown with certain portions broken away to depict otherwise hidden structure.
Figure 3:
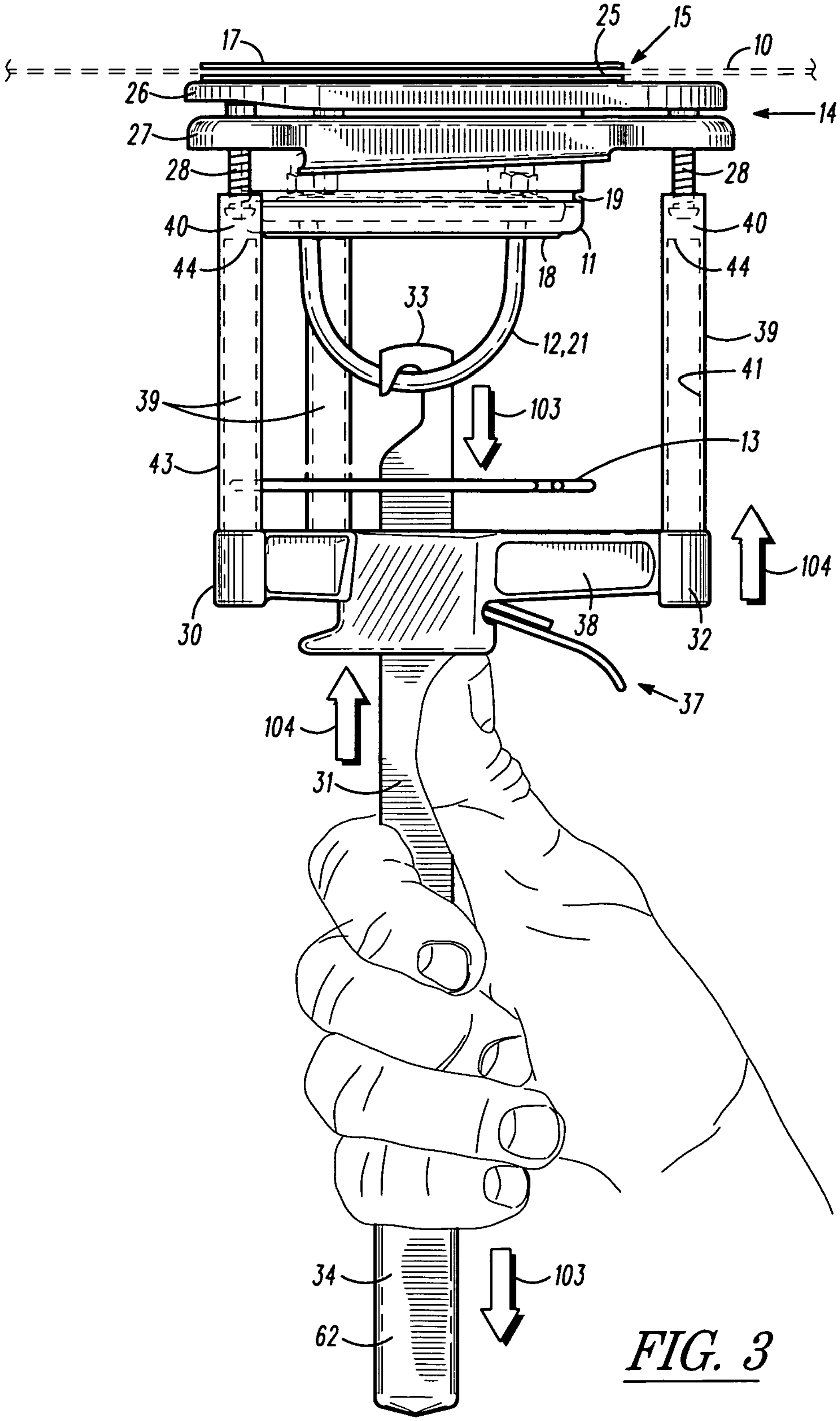
FIG. 3 is a side view depiction of the installation apparatus being attached to the ring-cap assembly shown in FIG. 2 with certain parts of the apparatus and ring-cap assembly shown in broken lines to depict otherwise hidden structure.
Figure 4:
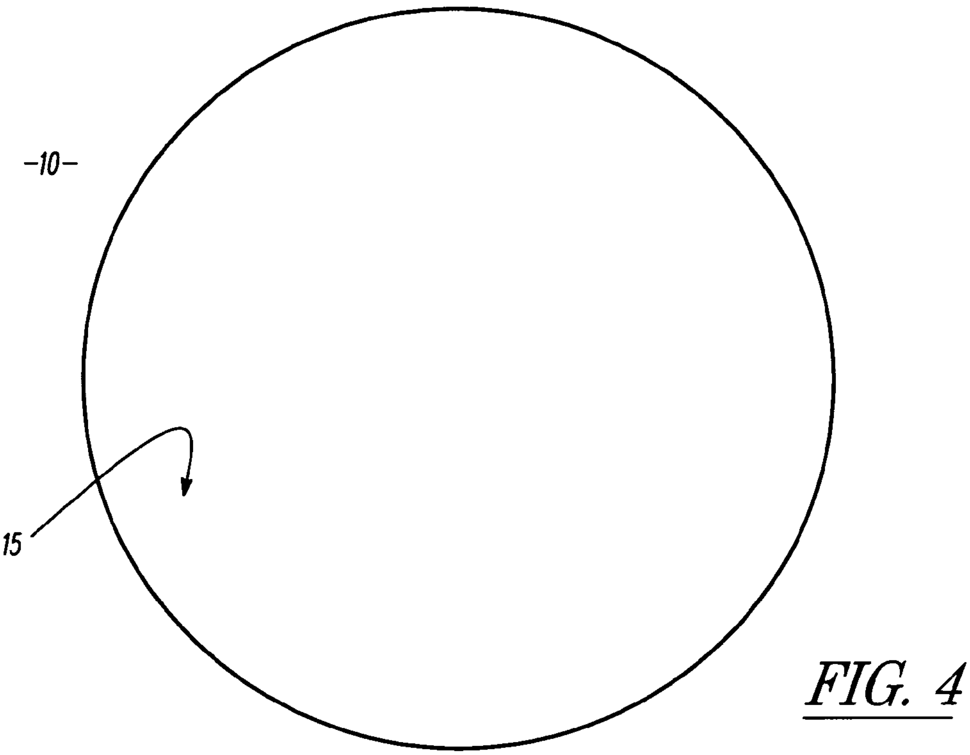
FIG. 4 is a top plan view of a drain aperture formed in a sink basin, the drain aperture for receiving a flanged drain collar or sink flange.
Figure 5:
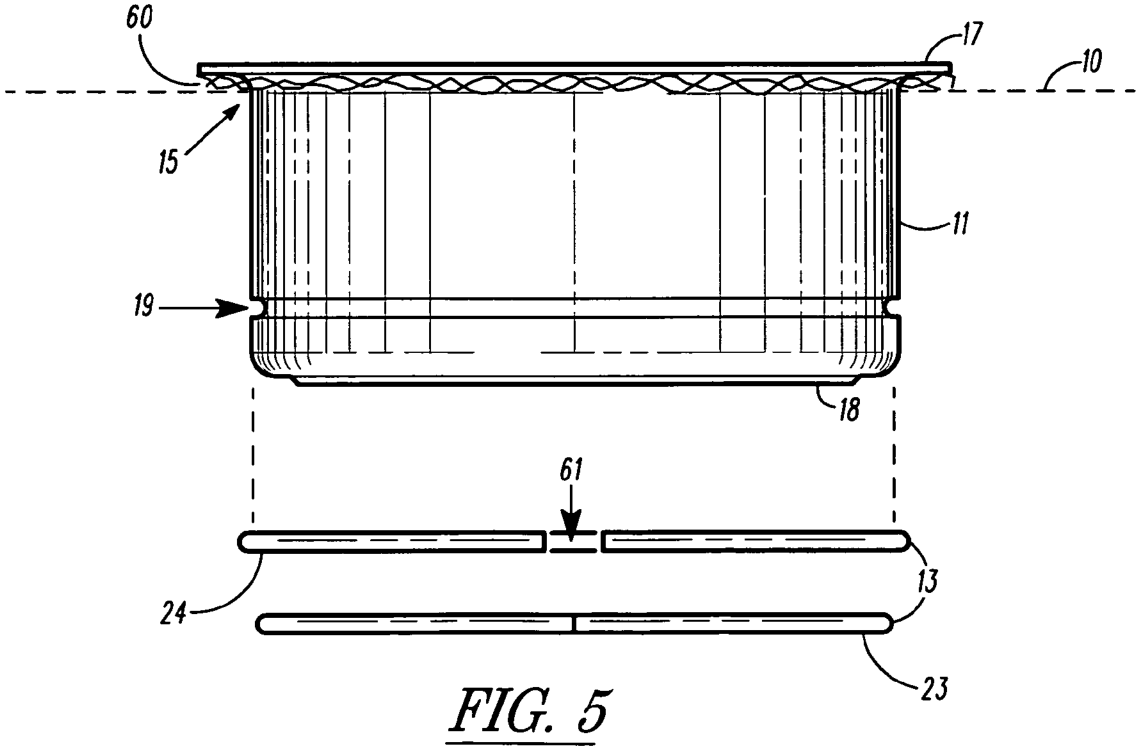
FIG. 5 is side view depiction of a flanged drain collar or sink flange received in a drain aperture (as depicted in FIG. 4) of a fragmentary sink basin juxtaposed in superior adjacency to depictions of first and second snap ring fasteners, the first fastener being in an actuated state and the second fastener being in a relaxed state.
Figure 6:
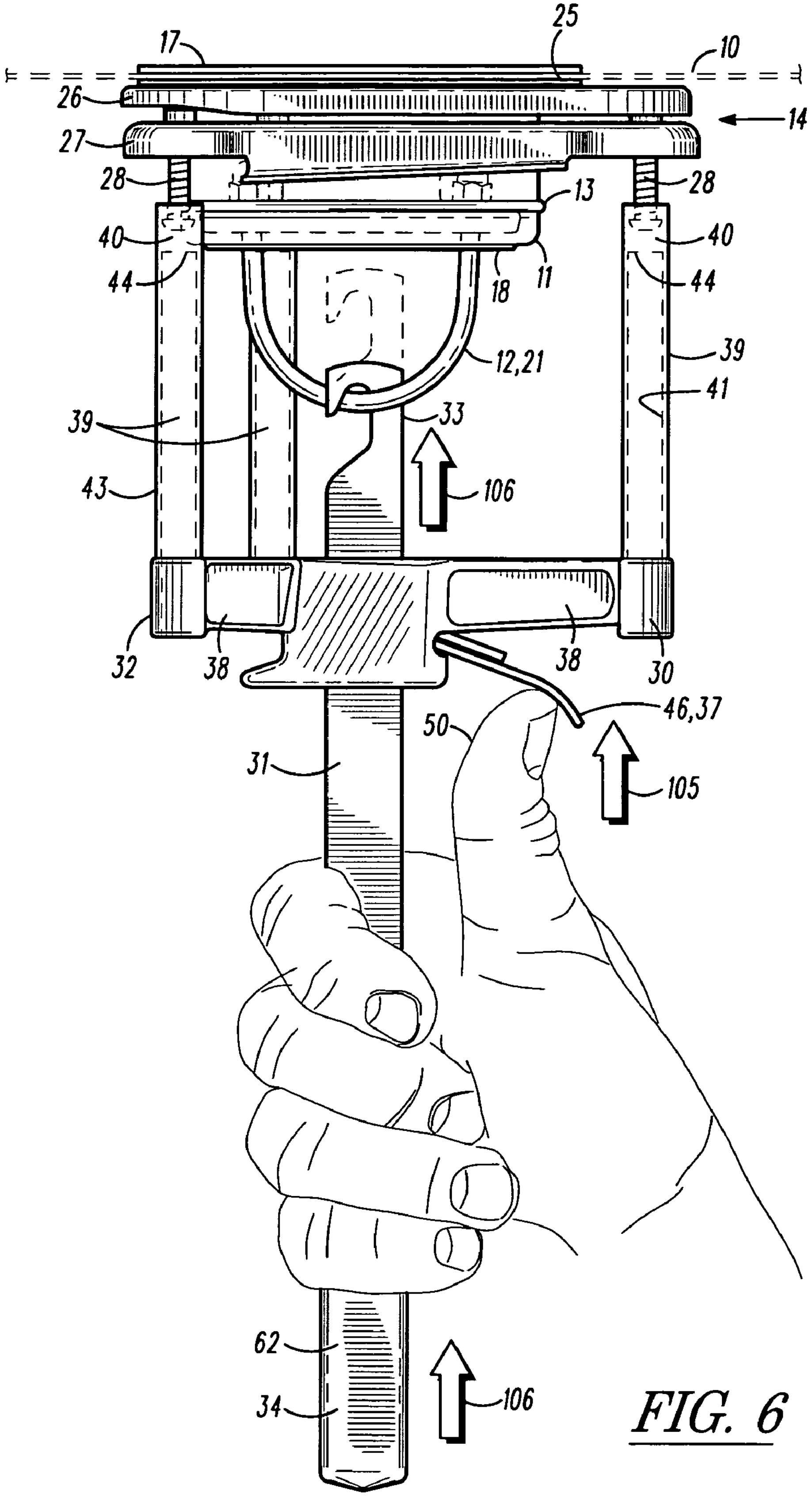
FIG. 6 is a side view depiction of the installation apparatus being removed from the ring-cap assembly shown in FIG. 2 with certain parts of the apparatus and ring-cap assembly shown in broken lines to depict otherwise hidden structure and certain parts of the hooked guide rail shown in broken lines to depict guide rail translation relative to the carriage assembly.

Conventional or typical plumbing components of the type here contemplated may well include a sink or sink basin 10 as illustrated and referenced in FIGS. 2-7, 9, and 10; a sink flange or flanged drain collar 11 as illustrated and referenced in FIGS. 2, 3, 5-8, and 10; a ring-cap assembly 12 (also cooperative with clamp 30 for anchoring sink flange 11) as illustrated and referenced in FIGS. 2, 3, 6-8, 10, 11, 12, and 13; a snap ring fastener 13 as illustrated and referenced in FIGS. 2, 3, 5, and 6; a waste disposal upper mounting assembly 14 as generally illustrated and referenced in FIGS. 2, 3, and 6; and a waste disposal unit (not specifically illustrated). It should be understood from a consideration of the noted figures that the sink basin 10 is system-supporting. That is, the sink or sink basin 10 is anchored to surrounding structure (such as kitchen counter cabinetry 16 as referenced in FIG. 7) and functions to provide a foundational anchor to which other elements may be fixed or anchored.

As earlier stated, sink or sink basin 10 preferably comprises a drain aperture 15 as generally depicted and referenced in FIGS. 2-5, 7, 9, and 10. A flanged interfacing device otherwise known as a sink flange or flanged drain collar 11 is receiveable in the drain aperture 15 and comprises an outwardly extending sink-engaging flange 17 as illustrated and referenced in FIGS. 2, 3, 5-8, and 10; an inwardly extending cap-engaging flange 18 as further referenced in FIGS. 2, 3, 5-8, and 10; and a ring-receiving recess 19 intermediate the sink and cap-engaging flanges 17 and 18 as illustrated and referenced in FIGS. 2, 3, 5, 7, 8, and 10. It may be seen from an inspection of the noted figures that the sink-engaging flange 17 essentially functions to support the drain collar 11 at the drain aperture 15 or bottom of the sink basin 10.

The ring-cap assembly 12 is receivable in the flanged drain collar 11 and comprises a drain-sealing cap 20 as illustrated and referenced in FIGS. 2, 7, 8, and 10; a hook ring 21 as further illustrated and referenced in FIGS. 2, 3, 6-8, 10, 11, and 12; and typically a cap gasket 22 for sealing the junction intermediate the cap 20 and the cap-engaging flange 18 as illustrated and referenced in FIGS. 2, 7, 8, and 10. The cap-engaging flange 18 essentially functions to support the ring-cap assembly 12 in the flanged drain collar 11. It should be readily understood from an inspection of FIG. 10 that an anchoring downward force (i.e. a force sufficient in magnitude) as at 100 may well function to anchor the ring-cap assembly 12 and thus drain collar 11 at the drain aperture 15 of the sink basin 10.

The spring-actuable snap ring fastener 13 is actuably receivable in the ring-receiving recess 19 as comparatively depicted in FIGS. 2 and 3 versus 6 and as generally depicted in FIG. 5. From an inspection of FIG. 5, it will be seen that snap ring fastener 13 is shown (in the lower position) in a relaxed state at 23 and (in the upper position) in an actuated state at 24. When received in the ring-receiving recess 19, snap ring fastener 13 is sized and shaped to partially return to the relaxed state 23 via spring-type restorative forces or similar means to retain the snap ring fastener 13 in the ring-receiving recess 19.

The waste disposal upper mounting assembly 14 comprises a number of components, including a mount gasket 25, a back-up ring 26, a mounting ring 27; and a plurality (typically three (3)) of mounting assembly fasteners 28 all as illustrated and referenced in FIGS. 2, 3, and 6. It should be readily understood from an inspection of the noted figures that the fasteners 28 are threadably attachable to the mounting ring 27 and downwardly extendable therefrom in parallel relation to one another. In this regard, the mounting ring 27 typically has three (3) circumferentially and equally spaced fastener-receiving flanges comprising fastener-receiving apertures through which fasteners 28 are threadably received. Mounting ring 27 further comprises a thread-like flange 29 for threadably receiving the mouth of a waste disposal unit (not specifically illustrated), which flange 29 is illustrated and referenced in FIG. 2.

The clamp or installation tool 30 of the present invention preferably comprises a guide rail 31 and a carriage assembly 32 both of which are illustrated and referenced in FIGS. 1-3, 6, 11, 12, 13, 14, and 15. The guide-rail 31 or carriage guide preferably comprises a first hooked end 33 as referenced in FIGS. 1-3, 6, 11, 12, and 13-15; a second handled end 34 as referenced in FIGS. 1-3, 6, 14, and 15; a notched face 35 extending intermediate the first and second ends 33 and 34 as generally depicted and referenced in FIGS. 11-13; and, as may be readily understood, a longitudinal rail or guide axis 101 as referenced in FIGS. 1 and 11-13. The carriage assembly 32 preferably comprises a centralized rail guide aperture 36 as referenced in FIGS. 1 and 14; a plurality of (trilateral) fastener-engaging arm assemblies; and certain carriage-to-(carriage) guide locking means for selectively preventing translation of the carriage assembly 32 relative to the carriage guide or guide rail 31.

It is contemplated that the means for selectively preventing translation of the carriage assembly 32 relative to the carriage guide 31 may be preferably defined by a push-button, spring-actuable notch stop assembly 37 as illustrated and referenced in FIGS. 1-3, 6, 11, 12, 13, 14, and 15. The fastener-engaging arm assemblies may be preferably defined by trilaterally radiating shaft-retaining arms 38 and parallel support shafts 39 cooperably associated with the arms 38 as illustrated and referenced in FIGS. 1-3, 6, 11, 12, 13, 14, and 15. It is contemplated that support shafts 39 may be fixedly or removably attached to shaft-retaining arms 38. For example, the arm-engaging end of support shafts 39 may be bolt threaded (as depicted in FIGS. 14 and 15 at 102), c-clipped, beveled, tapered, slip-fit, etcetera. Opposite the arm-engaging end of support shafts are fastener-receiving ports 40.

Fastener-receiving ports 40 function to receive mounting assembly fasteners 28 and align the carriage or carriage assembly 32 with the sink mount or upper mounting assembly 14 as generally depicted in FIGS. 2, 3, and 6. Ports 40 are further illustrated and referenced in FIGS. 1, 14, and 15. It may be seen from an inspection of the noted figures that ports 40 comprise internal stop structure 44 for restricting fasteners 28 from further shaft penetration. In this regard, it is contemplated that support shafts 39 may comprise an internal metallic bolt-like member 41 with an exposed arm-engaging end (as at 42 in FIGS. 14 and 15), which member 41 is sheathed by a polymer-based sleeve 43, which sleeve 40 terminates such that port 40 may be formed as generally depicted and referenced in FIGS. 2, 3, 6, and 15. The inner diameter of sleeve 43 and the outer diameter of member 41 should approximate the outer head diameter of fastener 28 so as to effect a snug engagement when fasteners 28 are received in the fastener-receiving ports 40.

Figure 11:
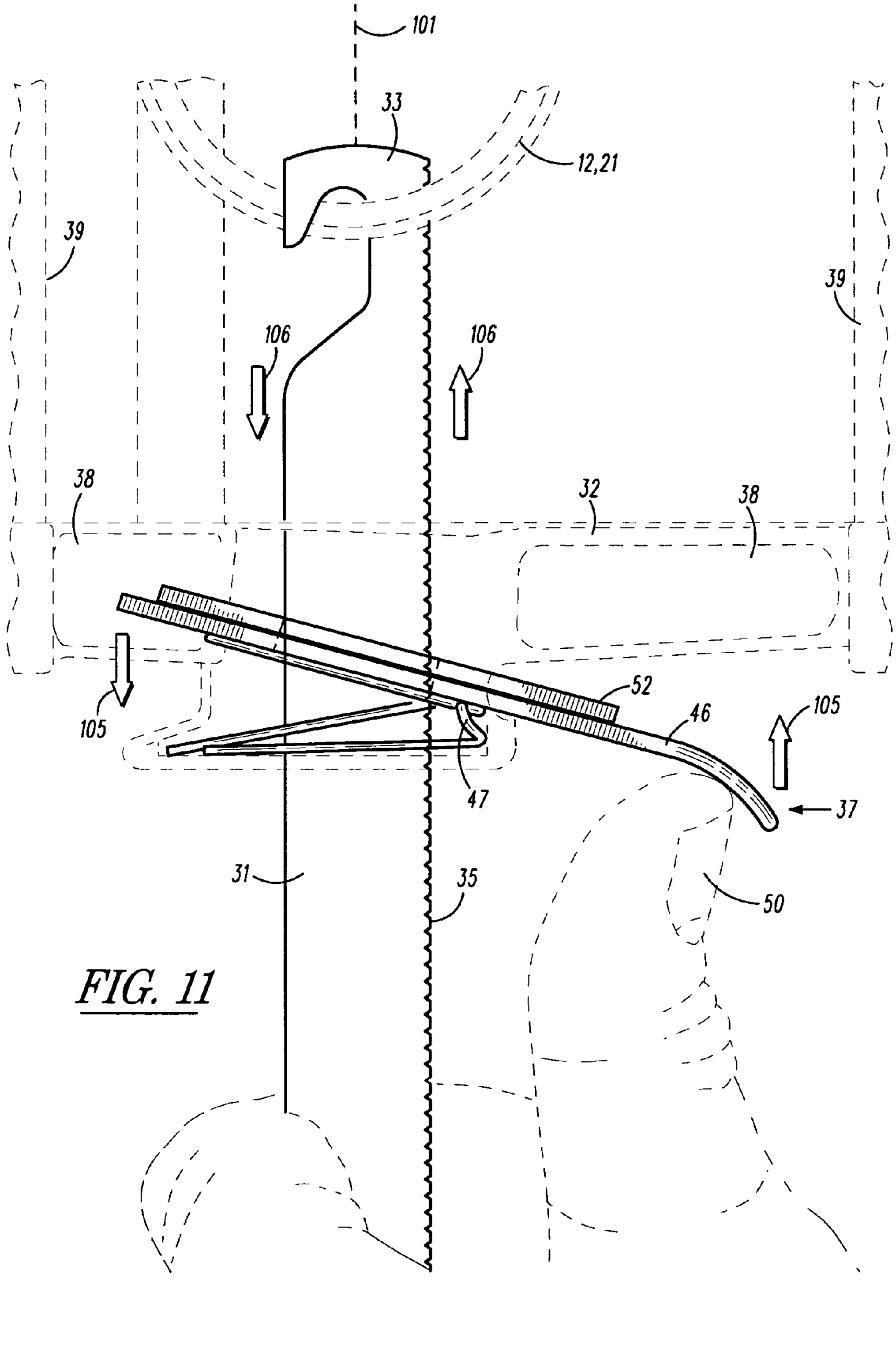
FIG. 11 is a fragmentary enlarged side view depiction of the spring-actuable notch stop assembly of the carriage assembly being operatively engaged with the notched face of the guide rail in a first notched face orientation for selectively preventing translation of the carriage assembly relative to the guide rail.
Figure 12:
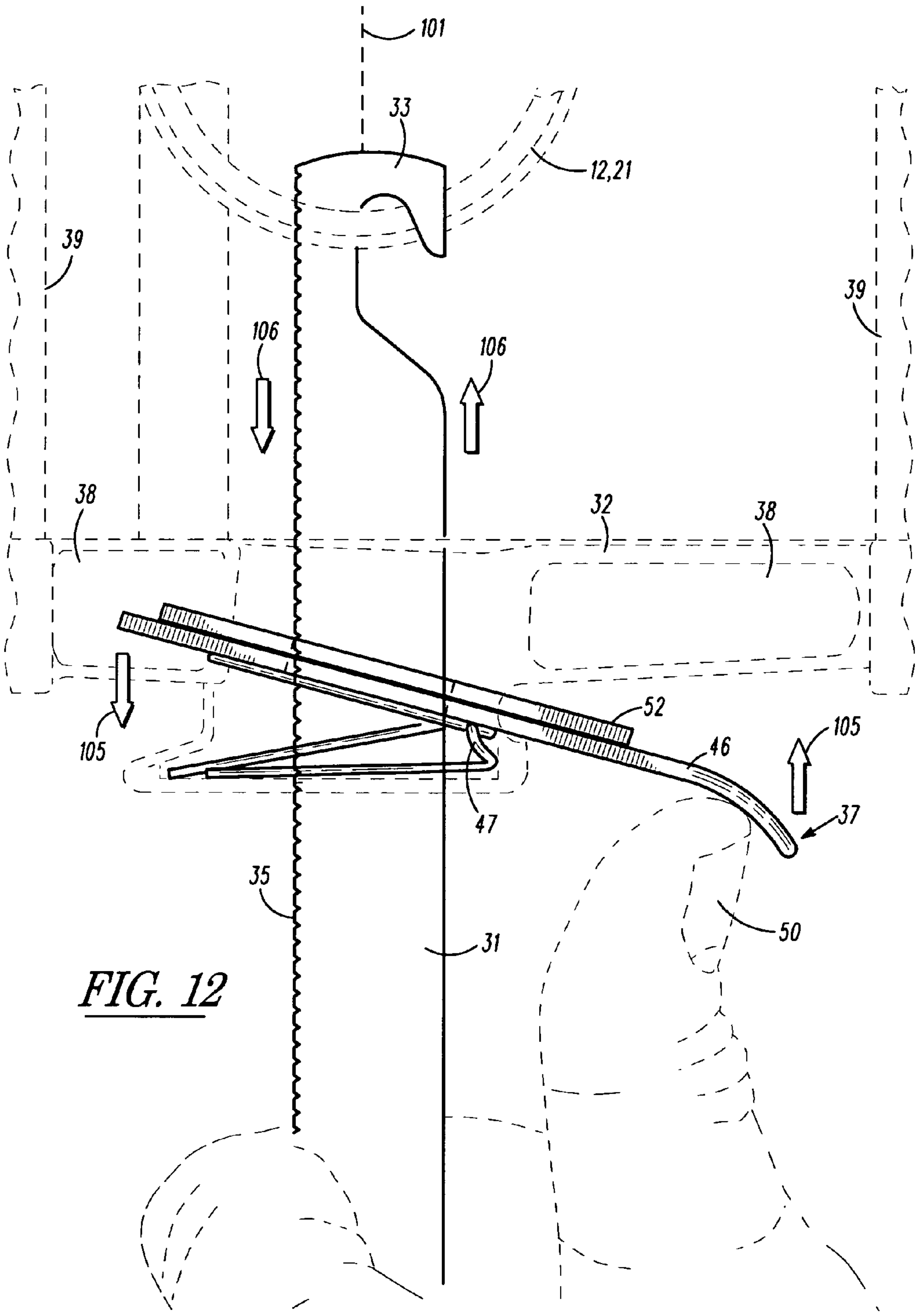
FIG. 12 is a fragmentary enlarged side view depiction of the spring-actuable notch stop assembly of the carriage assembly being operatively engaged with the notched face of the guide rail in a second notched face orientation for selectively preventing translation of the carriage assembly relative to the guide rail.
Figure 13:
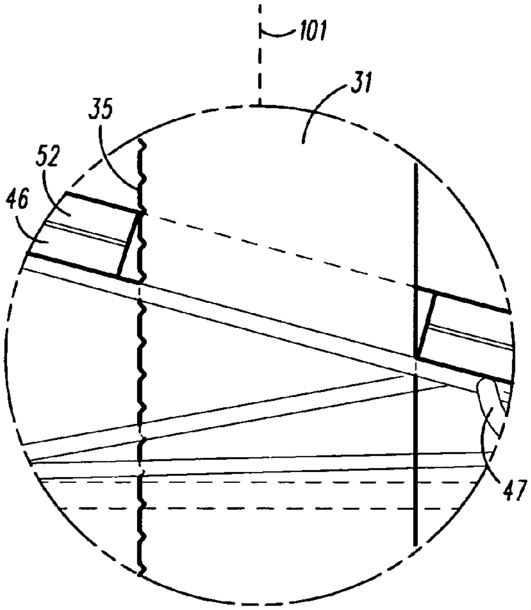
FIG. 13 is a fragmentary reduced side view depiction of the spring-actuable notch stop assembly of the carriage assembly being operatively engaged with the notched face of the guide rail in the first notched face orientation for selectively preventing translation of the carriage assembly relative to the guide rail.
Figure 13:
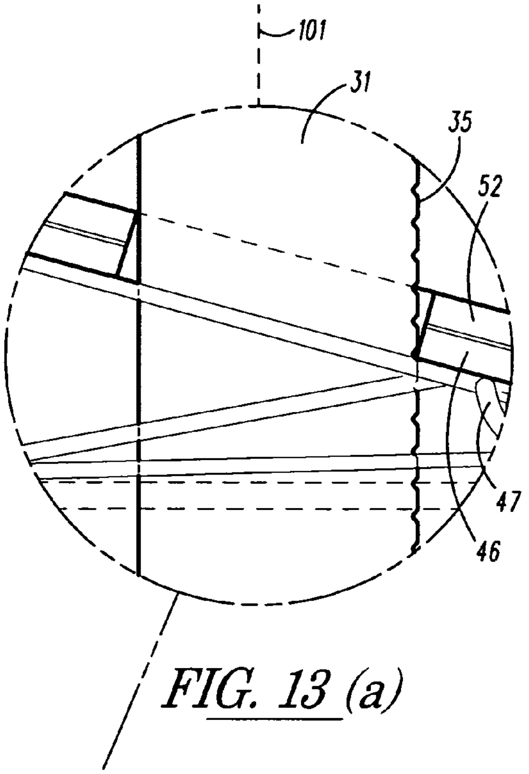
Figure 13:
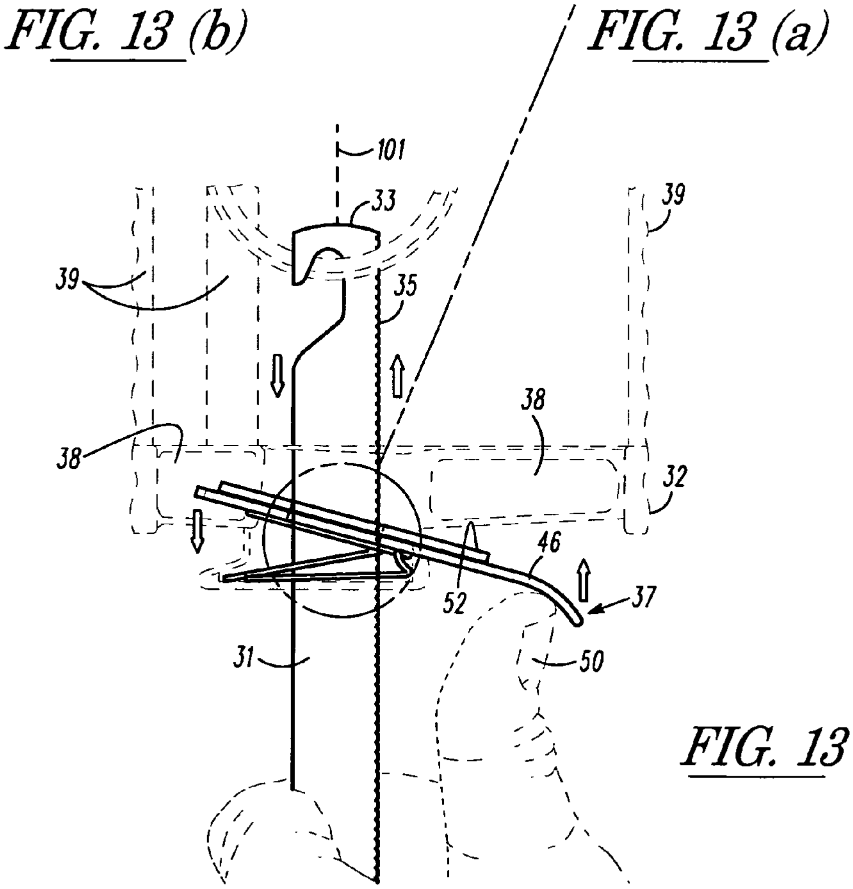

The guide aperture 36 is sized and shaped to slidably receive the guide rail 31. The spring-actuable notch stop or notch stop assembly 37 is engageable with the notched face 35 for enabling a user to selectively prevent carriage translation relative to the guide rail 31 as perhaps may be most clearly understood from a comparative inspection of FIGS. 11-13(*b*). In this regard, it will be recalled that the notch stop assembly 37 is preferably push-button actuable via certain spring means as generally depicted in FIGS. 6, 11-13(*b*). It may be readily understood from an inspection of the noted figures that a user's thumb 50 or other digit may function to depress a lever arm 46 (also outfitted with a rail-receiving aperture) for removing engagement of the lever arm 46 from engagement with the notched face 35 (as depicted in FIGS. 11-13(*b*)), the lever arm 46 being actuable about a spring-loaded fulcrum as at 47 in FIGS. 11, 12, 13(*a*), and 13(*b*). From an inspection of FIG. 6, it may be seen that a thumb 50 may well function to impart a lever arm-moving force as at 105, which operates to release the notch stop structure from engagement with the notched face 35 thereby releasing the guide rail 31 for enabling the user to translate (as at 106) the guide rail 31 relative to the fastener-to-port retained carriage assembly 32 unhook the hooked end 33 from the ring-cap assembly 12.

The guide rail may be further outfitted with a protruding button (as depicted in FIG. 14(*b*) at 48) or pin (as depicted in FIG. 14(*a*) at 49) adjacent the hooked end 33 to prevent the carriage assembly 32 from sliding off the guide rail 31 at the hooked end 33. The handled end 34 may also be outfitted with a protruding button 48 or pin 49 to prevent the carriage assembly 32 from sliding off the guide rail 31 at the handled end 34, although the handle 51 (preferably formed of a polymer-based material) is essentially a sheath 62 receivable about the guide rail 31 at the handled end 34 and has certain thickness, which thickness may also function to prevent carriage removal from the guide rail 31 at the handled end 34. It is contemplated that button 48 may be spring-actuable for enabling a user to depress the same and remove the carriage assembly 32 from the guide rail 31 if desired. Alternatively, the pin 49 or button 48 may be omitted for enabling the user to reverse the guide rail 32 or otherwise reorient the guide rail 31 about the rail axis 101 as comparatively depicted in FIGS. 12 versus 13(*a*). In this last regard, it is contemplated that the reversible or reorientable carriage guide 31 may well function to enable a first notched face orientation (as in FIGS. 11, 13, and 13(*a*)) and a second notched face orientation (as in FIGS. 12 and 13(*b*)) for selectively hooking the ring-cap (and sink flange) assembly 12.

In this regard, it is contemplated that operating space is often limited in inferior adjacency to ring-cap assemblies 12 (or ring-cap-sink-flange assemblies) and thus a reorientable guide rail 31 or hooked end 33 may thus be desirous. In any event, it is further contemplated that the spring-actuable notch stop assembly 37 is cooperable with both the first and second notched face orientations for selectively preventing translation of the carriage 32 relative to the carriage guide 31. From a comparative inspection of FIG. 11 versus FIG. 12 (and FIG. 13(*b*) versus FIG. 13(*a*)), it may be seen that in the first notched face orientation, the lever arm 46 functions to engage the notched face 35 for preventing carriage translation, and in the second notched face orientation, certain stock material 52 (also comprising a rail-receiving aperture and further resting adjacent lever arm 46) may well function to engage the notched face 35 for preventing carriage translation.

To operate the clamp or installation tool or apparatus 30 of the present invention, it will be recalled that the fastener-engaging arm assemblies extend outwardly from the guide aperture 36 for coupling engagement with the mount assembly fasteners 28, and that the arm assemblies comprise a plurality of parallel (or unidirectional) fastener-receiving ports 40. The upper mounting assembly 14 is thus receivable about the guide rail 31 and the fasteners 28 are receivable in the fastener-receiving ports 40 as generally depicted in FIG. 2. From a further consideration of FIG. 2 and other figures, it may be seen that the back-up ring 26 is sandwiched intermediate the mounting ring 27 and the gasket 25. The hooked end 33 of the guide rail 31 is (selectively) hookable upon the hook ring 21 (which ring 21 functions as a hookable portion of a structural mount) for imparting a ring-cap-sink-flange assembly anchoring force as at 103, and the carriage assembly 32 is (manually) translatable toward the flanged drain collar or sink flange 11 along the guide rail 31 as generally depicted in FIG. 33 at 104. In other words, the hooked end 33 essentially functions to direct the carriage assembly 32 and the "carriage-carried" upper mounting assembly 14 to the mount position via the carriage guide 31.

The upper mounting assembly 14 is thereby positionable intermediate the sink-engaging flange 17 and the ring-receiving recess 19 of the flanged drain collar or sink flange 11 with the gasket being sandwiched intermediate the back-up ring 26 and (the inferior surface of) the sink basin 10. Notably, the arms 38 of the carriage 32 may be regarded as defining certain means for carrying the snap ring fastener 13 to a ring position. In this regard, the reader is directed to FIGS. 2 and 3 which depict the snap ring fastener 13 exploded from the trilateral arm structure in superior adjacency thereto for ease of inspection. The snap ring fastener 13 may otherwise normally rest atop the arms 38, such that when the carriage assembly 32 is translated, the snap ring fastener 13 may ride thereupon. The noted ring position would thus be in inferior adjacency to the mount position (i.e. the position of the upper mounting assembly 14 before the snap ring fastener 13 is installed in ring-receiving recess 19). It is contemplated that the so-called ring position may well function to situate the snap ring fastener 13 in inferior adjacency to the upper mounting assembly 14 for enhancing snap ring fastener installation insofar as the snap ring fastener 13, in a sense, may be thus "served" to the installer by its placement in the ring position.

The means for selectively preventing translation of the carriage assembly 32 relative to the guide rail or carriage guide 31, as may be preferably defined by the spring-actuable notch stop assembly 37 may thus function (1) to lock the carriage assembly 32 upon the guide rail or carriage guide 31 with the upper mounting assembly 14 fixedly positioned intermediate the sink-engaging flange 17 and the ring-receiving recess 19 and (2) to temporarily fix the flanged drain collar 11. The clamp or installation apparatus 30 of the present invention thus essentially functions to enhance an installer's ability to manually install the snap ring fastener 13 upon the flanged drain collar 11. The snap ring fastener 13, thus installed, further prevents downward displacement of the upper mounting assembly 14 relative to the flanged drain collar 11. The upper mounting assembly 14, thus positioned, enables proper waste disposal unit mounting.

While the above descriptions contain much specificity, this specificity should not be construed as limitations on the scope of the invention, but rather as an exemplification of the invention. For example, the invention may be said to essentially teach or disclose a clamp or installation apparatus for clamping a waste disposal mounting assembly (such as upper mounting assembly 14) adjacent a drain-received sink flange (such as flanged drain collar or sink flange 11). The clamped mounting assembly enhances installation of a mount-retaining snap ring fastener (such as fastener 13) upon the sink flange. The clamp of the present invention is thought to essentially comprise a carriage (such as carriage assembly 32), a carriage guide (such as guide rail), and certain carriage-locking means (such as the spring-actuable notch stop assembly 37).

The carriage-locking means essentially function to selectively lock the carriage upon the carriage guide, which carriage is removably attachable to a waste disposal mounting assembly for carrying the mounting assembly to a mount position via the carriage guide. The mounting assembly is selectively locked at the mount position via the carriage and carriage-locking (or carriage-to-guide locking) means. The selectively locked mounting assembly enables enhanced snap ring fastener installation, the snap ring fastener installation for retaining the mounting assembly at the mount position when the carriage is removed from the mounting assembly.

Figure 7:
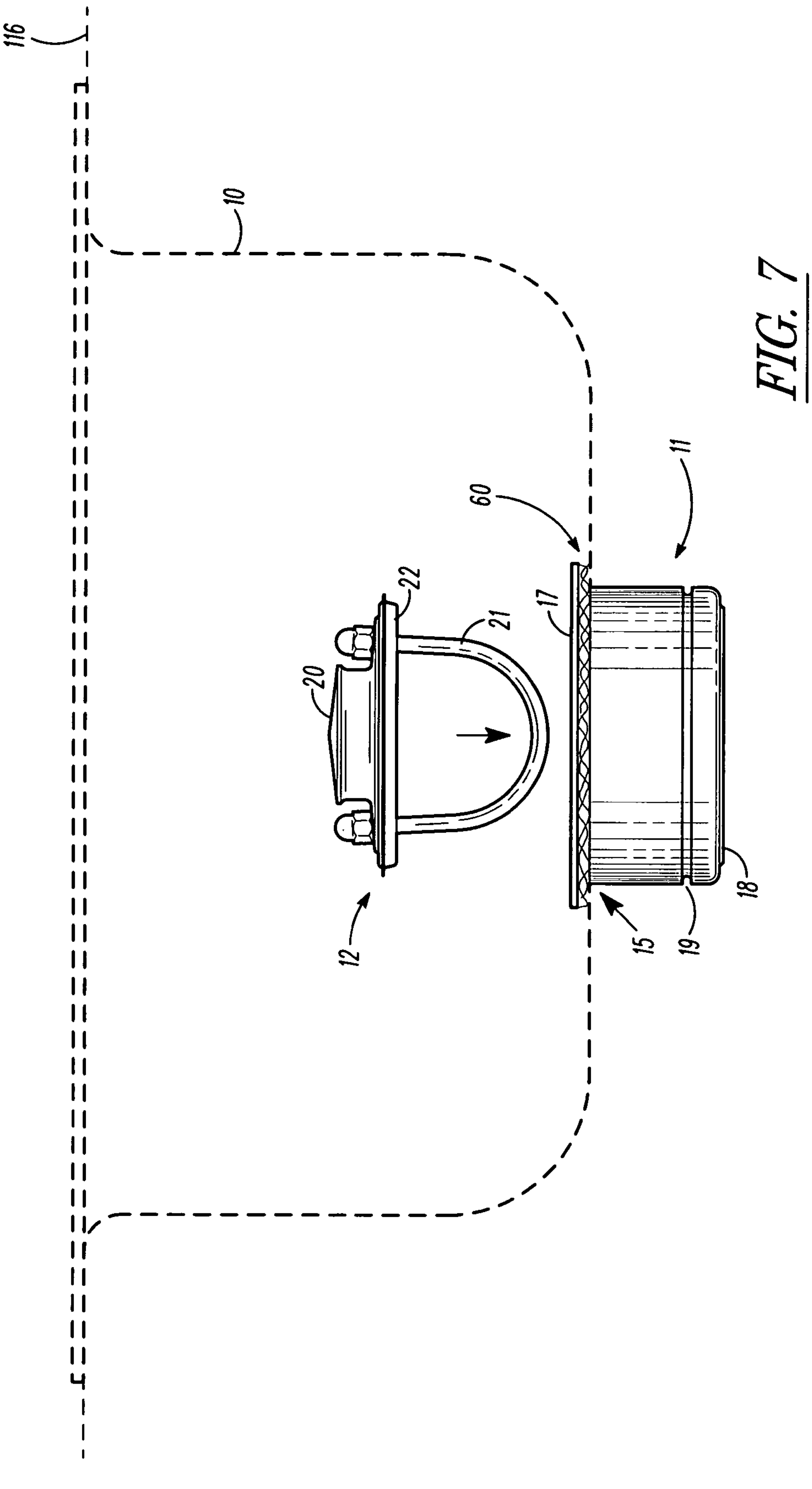
FIG. 7 is a side view depiction of the a ring-cap assembly being received in a flanged drain collar or sink flange, which sink flange is received in a drain aperture formed in a system-supporting sink basin, the sink basin being shown in broken lines.
Figure 8:
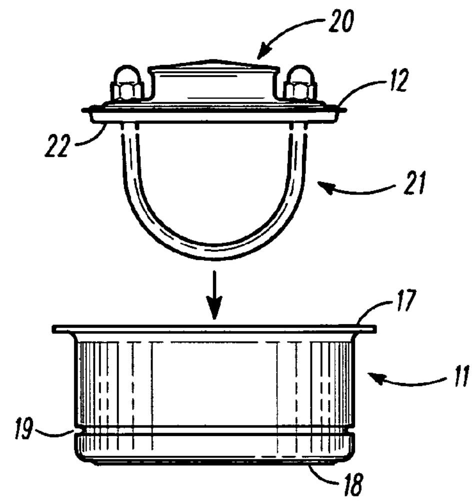
FIG. 8 is a side view depiction of a ring-cap assembly being received in a flanged drain collar or sink flange to form a ring-cap-sink-flange assembly.
Figure 9:
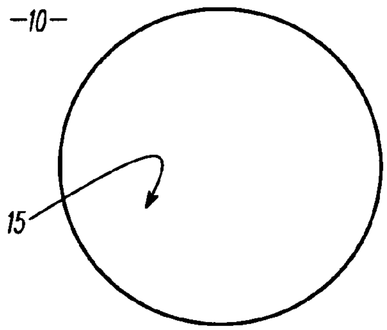
FIG. 9 is a top plan view of a drain aperture for receiving the flanged drain collar or sink flange shown in FIG. 8.
Figure 10:
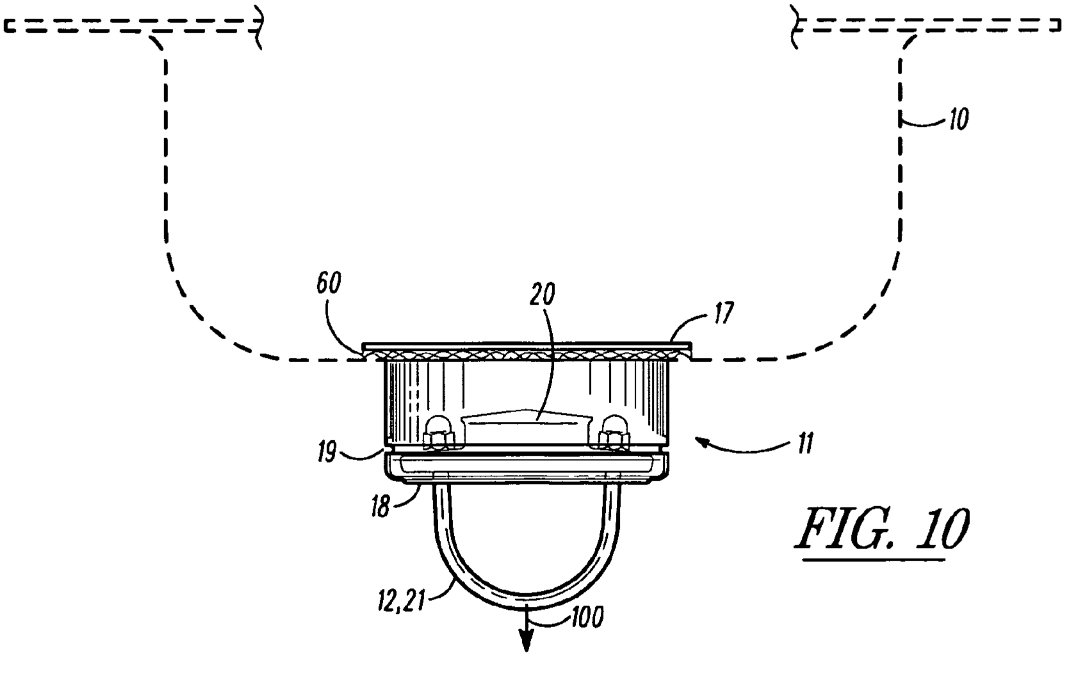
FIG. 10 is a fragmentary side view depiction of a system-supporting sink basin (shown in broken lines) having received the ring-cap-sink-flange assembly being formed in FIG. 8.

Further, it is contemplated that the foregoing descriptions may well function to support certain installation processes inherently taught by the structure of the installation tool or apparatus 30 of the present invention. In this regard, it is contemplated that a method for installing a waste disposal mounting assembly may comprise the steps of: supporting a flanged drain collar 11 at a drain aperture 15 as generally depicted in FIGS. 5 and 7; supporting a ring-cap assembly 12 at the flanged drain collar 11 as generally depicted in FIGS. 2, 7, 8, 10; removably attaching a waste disposal mounting assembly (such as upper mounting assembly 14) to a carriage (such as carriage assembly 32) as generally depicted in FIG. 2; translatably associating the carriage 32 and mounting assembly 14 with a carriage guide 31 as generally depicted in FIGS. 2, 3, and 6; removably attaching the carriage guide 31 to the ring-cap assembly 12 as comparatively depicted in FIG. 2 versus FIG. 3; guiding the carriage 32 and mounting assembly 14 to a mount position via the carriage guide 31 as generally depicted in FIG. 3; locking the carriage 32 and mounting assembly 14 at the mount position via carriage-locking means (such as spring-actuable notch stop assembly 37) as generally depicted in FIG. 3; and installing a snap ring fastener 13 upon the flanged drain collar 11 (as generally depicted in FIG. 6) thereby installing the mounting assembly 14. After installing the snap ring fastener 13 upon the flanged drain collar 11, certain additional steps may be undertaken to detach the clamp or installation tool for finally mounting the mounting assembly 14, including unlocking the carriage 32 via the carriage-locking means; detaching the carriage 32 from the mounting assembly 14 (by translating the carriage 32 away from the mounted mounting assembly 14); guiding the carriage 32 to a tool removal position (not specifically illustrated) via the carriage guide 31; and detaching the carriage guide 31 from the ring-cap assembly 12.

It is contemplated that sealer(s) 60 may be applied to the flanged drain collar 11 before supporting the flanged drain collar 11 at the drain aperture 15 in order to effect a moisture-impermeable seal therebetween as generally depicted and referenced in FIGS. 2, 5, 7, and 10. Notably, the snap ring fastener 13 may be supported upon the carriage 32 before guiding the carriage 32 and mounting assembly 14 to the mount position as may be the case if the snap ring fastener 13 were relaxably looped about the carriage guide 31 before attaching the mounting assembly 14 to the carriage 32 or actuably looped about the carriage guide 31 after attaching the mounting assembly 14 to the carriage 32. In this last regard, it is noted that the snap ring fastener comprises a spring-actuable stock that may be elastically deformed. If the carriage 32 has already been attached to the mounting assembly 14 (thereby preventing one from simply looping the ring-like structure over the guide 31), it is contemplated that the snap ring fastener 13 may be actuated so as to increase the gap 61 between ends (as generally depicted in FIG. 5), which gap 61 may then receive the guide 31.

The step of removably attaching the mounting assembly 14 to the carriage 32 may be preferably defined by inserting mounting ring fasteners 28 of the mounting assembly 14 into fastener-receiving ports 40 of the carriage 32, which mounting ring fasteners 28 may further function to support a mounting ring 27 of the mounting assembly 14; supporting a back-up ring 26 upon the mounting ring 27; and supporting a gasket 25 upon the back-up ring 26. The step of removably attaching the carriage guide 31 to the ring-cap assembly 12 may be preferably defined by hooking a hooked end 33 of the carriage guide 31 upon a ring 21 of the ring-cap assembly 12.

Accordingly, although the invention has been described by reference to a number of preferred embodiments, and certain methodology, it is not intended that the novel apparatus and method(s) be limited thereby, but that modifications thereof are intended to be included as falling within the broad scope and spirit of the foregoing disclosure, the following claims and the appended drawings.

We claim:

1. A waste disposal sink mount installation system, the installation system for temporarily fixing a flanged drain collar, the temporarily fixed drain collar for enhancing manual installation of a mount-retaining snap ring fastener thereupon, the installation system comprising, in combination:

a system-supporting sink basin, the sink basin comprising a drain aperture;

a flanged drain collar, the drain collar being receiveable in the drain aperture and comprising an outwardly extending sink-engaging flange, an inwardly extending cap-engaging flange, and a ring-receiving recess intermediate the sink and cap-engaging flanges, the sink-engaging flange for supporting the drain collar at the sink basin;

a spring-actuable snap ring fastener, the snap ring fastener being actuably receivable in the ring-receiving recess;

a ring-cap assembly, the ring-cap assembly being receivable in the flanged drain collar and comprising a drain-sealing cap and a hook ring, the cap-engaging flange for supporting the ring-cap assembly in the flanged drain collar;

a waste disposal upper mounting assembly, the upper mounting assembly comprising a mounting ring, and a plurality of fasteners, the fasteners being attachable to the mounting ring and downwardly extendable in parallel relation to one another; and an installation apparatus, the installation apparatus comprising a guide rail and a carriage assembly, the guide-rail and comprising a hooked end and a notched face, the carriage assembly comprising a centralized rail guide aperture, a plurality of fastener-engaging arm assemblies, and a spring-actuable notch stop, the guide aperture receiving the guide rail, the spring-actuable notch stop being engageable with the notched face for enabling a user to selectively prevent carriage translation relative to the guide rail, the arm assemblies comprising a plurality of parallel fastener-receiving ports, the upper mounting assembly being receivable about the guide rail, the fasteners being receivable in the fastener-receiving ports, the hooked end being hookable upon the hook ring, the carriage assembly being translatable toward the flanged drain collar along the guide rail, the upper mounting assembly thereby being positionable intermediate the sink-engaging flange and the ring-receiving recess, the spring-actuable notch stop for locking the carriage assembly upon the guide rail with the upper mounting assembly fixedly positioned intermediate the sink-engaging flange and the ring-receiving recess and for temporarily fixing the flanged drain collar, the installation apparatus thus for enhancing an installer's ability to manually install the snap ring fastener upon the flanged drain collar, the snap ring fastener, thus installed, for preventing downward displacement of the mounting assembly relative to the flanged drain collar, the mounting assembly, thus positioned, for enabling proper waste disposal unit mounting.

2. The system of claim 1 wherein the spring-actuable notch stop is push-button actuable, the push-button actuable notch stop for enhancing the installer's ability to manually install the snap ring fastener upon the flanged drain collar.

3. The system of claim 1 wherein the carriage comprises means for carrying the snap ring fastener to a ring position, the ring position for situating the snap ring fastener in inferior adjacency to the mounting assembly for enhancing snap ring fastener installation.

4. An installation tool, the installation tool for enhancing installation of a waste disposal mounting assembly upon a drain-received ring-cap-sink-flange assembly, the installation tool comprising:

a carriage guide, the carriage guide comprising a hooked end;

a carriage, the carriage being translatably and cooperably associated with the carriage guide and comprising a plurality of fastener-engaging arm assemblies, the arm assemblies comprising a plurality of fastener-receiving ports; and push-button actuable means for selectively preventing translation of the carriage relative to the carriage guide, said means being push-button actuable, the hooked end for hooking a drain-received ring-cap-sink-flange assembly, the fastener-receiving ports for receiving a plurality of mounting assembly fasteners, the carriage guide for guiding a mounting assembly attachable to the mounting assembly fasteners into a mount position adjacent the ring-cap-sink-flange assembly, said push-button actuable means being operable to fix the mounting assembly in the mount position, the mounting assembly, being fixable in the mount position, thereby being operable to fix the ring-cap-sink-flange assembly relative to an assembly-supporting sink basin, said push-button actuable means of the installation tool thus for enhancing an installer's ability to install a mounting assembly-retentive snap ring fastener upon the otherwise fixed ring-cap-sink-flange assembly.

5. The installation tool of claim 4 wherein the carriage comprises means for carrying the snap ring fastener to a ring position, the ring position for situating the snap ring fastener in inferior adjacency to the mounting assembly for enhancing snap ring fastener installation.

6. The installation tool of claim 4 wherein the carriage guide comprises a notched face and the carriage comprises a spring-actuable notch stop, the notched face and the spring-actuable notch stop together defining the means for selectively preventing translation of the carriage relative to the carriage guide.

7. The installation tool of claim 6 wherein the carriage guide comprises a longitudinal axis and is reversible about said axis, the reversible carriage guide for enabling first and second notched face orientations and for selectively hooking the ring-cap-sink-flange assembly, the spring-actuable notch stop being cooperable with both the first and second notched face orientations for selectively preventing translation of the carriage relative to the carriage guide.

8. A clamp, the clamp for clamping a waste disposal mounting assembly adjacent a drain-received sink flange, the clamped mounting assembly for enhancing an installer's ability to actuate mount-retaining means, the clamp comprising:

a carriage, a carriage guide, and push-button actuable carriage-locking means, the carriage-locking means for selectively locking the carriage upon the carriage guide, the carriage being removably attachable to a waste disposal mounting assembly for carrying the mounting assembly to a mount position via the carriage guide, the mounting assembly being selectively locked at the mount position via the carriage and push-button actuable carriage-locking means, the selectively locked mounting assembly enabling an installer to manually actuate mount-retaining means, the mount-retaining means for retaining the mounting assembly at the mount position when the carriage is removed from the mounting assembly, the push-button actuable carriage-locking means for enhancing the installer's ability to manually actuate the mount-retaining means.

9. The clamp of claim 8 wherein the carriage guide comprises a hooked end, the hooked end for hooking structure adjacent the mount position, the hooked end for directing the carriage and the carriage-carried mounting assembly to the mount position via the carriage guide.

10. The clamp of claim 8 wherein the carriage guide comprises a notched face and the carriage comprises an actuable notch stop; the notched face and the notch stop together defining the carriage-locking means.

11. The clamp of claim 10 wherein the carriage guide is reorientable about its axis, the reorientable carriage guide enabling a plurality of notched face orientations and enabling selectively hooked engagement with structure adjacent the mount position via the hooked end, the actuable notch stop being selectively cooperable with each of the notched face orientations for selectively preventing translation of the carriage relative to the carriage guide.

* * * * *